United States Patent
Kim et al.

(10) Patent No.: US 9,439,177 B2
(45) Date of Patent: *Sep. 6, 2016

(54) APPARATUS AND METHOD FOR TRANSMITTING AND RECEIVING PERSISTENT SCHEDULING INFORMATION IN WIRELESS COMMUNICATION SYSTEM

(71) Applicant: LG ELECTRONICS INC., Seoul (KR)

(72) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

This patent is subject to a terminal disclaimer.

(21) Appl. No.: 14/363,907

(22) PCT Filed: Dec. 5, 2012

(86) PCT No.: PCT/KR2012/010467
§ 371 (c)(1),
(2) Date: Jun. 9, 2014

(87) PCT Pub. No.: WO2013/085273
PCT Pub. Date: Jun. 13, 2013

(65) Prior Publication Data
US 2014/0369288 A1    Dec. 18, 2014

Related U.S. Application Data

(60) Provisional application No. 61/568,158, filed on Dec. 8, 2011.

(30) Foreign Application Priority Data

Mar. 30, 2012 (KR) ........................ 10-2012-0033484

(51) Int. Cl.
*H04W 4/00*    (2009.01)
*H04W 72/04*    (2009.01)
(Continued)

(52) U.S. Cl.
CPC ........ *H04W 72/0406* (2013.01); *H04L 1/1893* (2013.01); *H04L 1/1896* (2013.01); *H04W 4/005* (2013.01); *H04W 72/04* (2013.01); *H04L 5/0055* (2013.01)

(58) Field of Classification Search
None
See application file for complete search history.

(56) References Cited

U.S. PATENT DOCUMENTS

| 2009/0247174 A1 | 10/2009 | Zhang et al. |
| 2010/0246518 A1 | 9/2010 | Gheorghiu et al. |

(Continued)

FOREIGN PATENT DOCUMENTS

| JP | 2013-524719 | 6/2013 |
| KR | 10-2009-0064506 | 6/2009 |

(Continued)

OTHER PUBLICATIONS

PCT International Application No. PCT/KR2012/010467, Notification of Transmittal of the International Search Report and the Written Opinion of the International Searching Authority, or Declaration dated Mar. 11, 2013, 9 pages.

(Continued)

*Primary Examiner* — Candal Elpenord
(74) *Attorney, Agent, or Firm* — Lee Hong Degerman Kang & Waimey; Jonathan Kang; Jeffrey Lotspeich

(57) ABSTRACT

An apparatus and method for transmitting and receiving persistent scheduling information are provided. A machine-to-machine (M2M) device for receiving persistent scheduling information in a wireless communication system includes a receiver configured to receive, from a BS, a message comprising allocation period information including a persistent allocation period for the M2M device, wherein the message further comprises de-allocation information that indicates whether the de-allocation corresponds to a permanent de-allocation or one-time de-allocation when the allocation period information indicates a de-allocation, and wherein the message does not comprise information about HARQ feedback allocation when the de-allocation information indicates the one-time de-allocation.

14 Claims, 2 Drawing Sheets

(51) Int. Cl.
   *H04L 1/18*   (2006.01)
   *H04L 5/00*   (2006.01)

(56) References Cited

U.S. PATENT DOCUMENTS

| | | | |
|---|---|---|---|
| 2010/0272047 A1* | 10/2010 | Zhu | H04W 72/04 370/329 |
| 2010/0316008 A1* | 12/2010 | Kim | H04L 1/1896 370/329 |
| 2011/0103323 A1* | 5/2011 | Wang | H04L 1/0026 370/329 |
| 2011/0128911 A1 | 6/2011 | Shaheen | |
| 2011/0158192 A1* | 6/2011 | Kim | H04L 5/0053 370/329 |
| 2011/0199905 A1 | 8/2011 | Pinheiro et al. | |
| 2011/0268006 A1 | 11/2011 | Koskela et al. | |
| 2011/0280202 A1* | 11/2011 | Lee | H04W 72/042 370/329 |
| 2012/0134329 A1* | 5/2012 | Lim | H04L 1/1854 370/329 |
| 2014/0010187 A1* | 1/2014 | Huang | H04W 4/005 370/329 |

FOREIGN PATENT DOCUMENTS

| | | |
|---|---|---|
| KR | 10-2011-0095933 | 8/2011 |
| KR | 10-2012-0027107 | 3/2012 |
| WO | 2008/115545 | 9/2008 |
| WO | 2011/129660 | 10/2011 |

OTHER PUBLICATIONS

Korean Intellectual Property Office Application Serial No. 10-2012-0033484, Notice of Allowance dated May 18, 2012, 2 pages.
Kim, et al., "Clarification of Long Cycle Persistent Allocation," IEEE 802.16-12-0020-01-010b, Jan. 2012, 5 pages.
Kim, et al., "De-allocation Method of Long Cycle Persistent Allocation," IEEE 802.16p-11/0317r5, Nov. 2011, 5 pages.

* cited by examiner

APPARATUS AND METHOD FOR TRANSMITTING AND RECEIVING PERSISTENT SCHEDULING INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2012/010467, filed on Dec. 5, 2012, which claims the benefit of earlier filing date and right of priority to Korean Application No. 10-2012-0033484, filed on Mar. 30, 2012, and also claims the benefit of U.S. Provisional Application Ser. No. 61/568,158, filed on Dec. 8, 2011, the contents of which are hereby incorporated by reference herein in their entirety.

TECHNICAL FIELD

The present invention relates to wireless communication, and more particularly, to an apparatus and method for transmitting and receiving persistent scheduling information in a wireless communication system.

BACKGROUND ART

Machine-to-machine (M2M) communication is communication between electronic devices as its appellation implies. While M2M communication means wired or wireless communication between electronic devices or communication between a human-controlled device and a machine in the broadest sense, these days M2M communication typically refers to wireless communication between electronic devices.

When the concept of M2M communication was introduced in the early 1990s, it was regarded merely as the concept of remote control or telematics and the market therefor was very limited. However, M2M communication has been drastically developed and the M2M communication market has attracted much attention all over the world over the past few years. Especially, M2M communication has a great influence in the fields of fleet management, remote monitoring of machines and facilities, smart metering for automatically measuring the working time of construction equipment and the consumption of heat or electricity, etc. in the Point Of Sales (POS) market and security-related applications. It is expected that M2M communication will find various uses in conjunction with legacy mobile communication, very high-speed wireless Internet or Wireless Fidelity (WiFi), and low-output communication solutions such as ZigBee and thus will extend to Business to Customer (B2C) markets beyond Business to Business (B2B) markets.

In the era of M2M communication, every machine equipped with a Subscriber Identity Module (SIM) card can be managed and controlled remotely because it is possible to transmit data to and receive data from the machine. For example, M2M communication is applicable to a very broad range including numerous terminals and equipment such as a car, a truck, a train, a container, an automatic vending machine, a gas tank, etc.

Conventionally, mobile stations are generally individually managed so that one-to-one communication was mainly performed between a base station and a mobile station. Assuming that numerous M2M devices communicate with the base station through one-to-one communication, network overload is expected due to signaling generated between each of the M2M devices and the base station. If M2M communication is rapidly spread and extensively used as described above, an overhead problem may occur due to communication between the M2M devices or between the M2M devices and the base station.

Before introduction of M2M devices, uplink persistent scheduling information of a BS for a mobile station has been defined. However, it is necessary to introduce regulations on uplink persistent scheduling information in consideration of characteristics of the M2M devices. However, such regulations have yet to be proposed. The present invention proposes persistent allocation with respect to uplink persistent scheduling for M2M devices.

DISCLOSURE OF INVENTION

Technical Problem

An object of the present invention is to provide a method for, at a BS, transmitting persistent scheduling information in a wireless communication system.

Another object of the present invention is to provide a method for, at an M2M device, receiving persistent scheduling information in a wireless communication system.

Another object of the present invention is to provide a BS for transmitting persistent scheduling information in a wireless communication system.

Another object of the present invention is to provide an M2M device for receiving persistent scheduling information in a wireless communication system.

The technical problems solved by the present invention are not limited to the above technical problems and those skilled in the art may understand other technical problems from the following description.

Solution to Problem

The object of the present invention can be achieved by providing a method of transmitting persistent scheduling information at a base station (BS) in a wireless communication system, the method including transmitting, to a machine-to-machine (M2M) device, a message comprising allocation period information including a persistent allocation period for the M2M device, wherein the message further comprises de-allocation information that indicates whether the de-allocation corresponds to a permanent de-allocation or one-time de-allocation when the allocation period information indicates a de-allocation, and wherein the message does not comprise information about hybrid automatic repeat request (HARM) feedback allocation when the de-allocation information indicates the one-time de-allocation. When the de-allocation information indicates the one-time de-allocation, a persistent resource allocated according to the message may be de-allocated in an uplink subframe indicated by the message. When the de-allocation information indicates one-time de-allocation, previous persistent allocation may be maintained. The message may be of an uplink M2M persistent allocation A-MAP IE type.

In another aspect of the present invention, there is provided a method of receiving persistent scheduling information at a machine-to-machine (M2M) device in a wireless communication system, the method including receiving, from a BS, a message comprising allocation period information including a persistent allocation period for the M2M device, wherein the message further comprises de-allocation information that indicates whether the de-allocation corresponds to a permanent de-allocation or one-time de-allocation when the allocation period information indicates a de-allocation, wherein the message does not comprise information about hybrid automatic repeat request (HARQ) feedback allocation when the de-allocation information indicates the one-time de-allocation. When the de-allocation information indicates the one-time de-allocation, a persistent resource allocated according to the message may be de-allocated in an uplink subframe indicated by the message. When the de-allocation information indicates the one-time de-allocation, previous persistent allocation may be maintained. When the de-allocation information indicates the one-time de-allocation, a acknowledgement/negative acknowledgement (ACK/NACK) signal for the message may not be transmitted to the BS. The message may be an uplink M2M persistent allocation A-MAP IE (Information Element) message.

In another aspect of the present invention, there is provided a base station (BS) for transmitting persistent scheduling information in a wireless communication system, which includes a transmitter configured to transmit, to a machine-to-machine (M2M) device, a message comprising allocation period information including a persistent allocation period for the M2M device, wherein the message further comprises de-allocation information that indicates whether the de-allocation corresponds to a permanent de-allocation or one-time de-allocation when the allocation period information indicates a de-allocation, and wherein the message does not comprise information about hybrid automatic repeat request (HARQ) feedback allocation when the de-allocation information indicates one-time de-allocation.

In another aspect of the present invention, there is provided a machine-to-machine (M2M) device for receiving persistent scheduling information in a wireless communication system, which includes a receiver configured to receive, from a BS, a message comprising allocation period information including a persistent allocation period for the M2M device, wherein the message further comprises de-allocation information that indicates whether the de-allocation corresponds to a permanent de-allocation or one-time de-allocation when the allocation period information indicates a de-allocation, and wherein the message does not comprise information about hybrid automatic repeat request (HARM) feedback allocation when the de-allocation information indicates the one-time de-allocation.

The M2M device may further include a processor configured to control a acknowledgement negative acknowledgement (ACK/NACK) signal for the message not to be transmitted to the BS when the de-allocation information indicates the one-time de-allocation.

The M2M device may further include a processor configured to control previous persistent allocation to be maintained when the de-allocation information indicates the one-time de-allocation.

Advantageous Effects of Invention

[According to the embodiments of the present invention, HFA information is not included in a UL M2M persistent allocation A-MAP IE message in the case of one time de-allocation which de-allocates resource allocation at a corresponding time while maintaining persistent allocation information such that an acknowledgement signal for the UL M2M persistent allocation A-MAP IE message which directs de-allocation only at the time is not transmitted, thereby considerably reducing overhead and improving communication performance.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
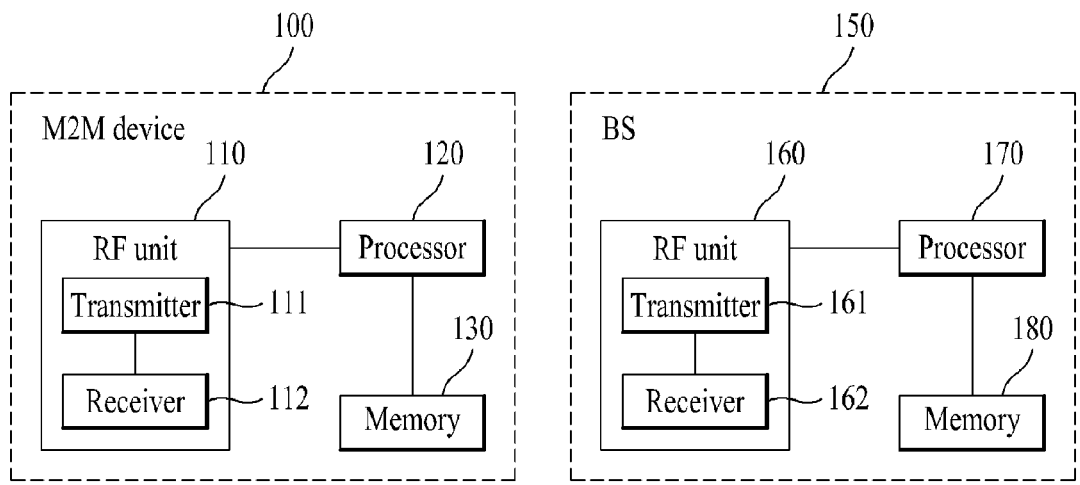
FIG. 1 is a diagram schematically explaining the configuration of an M2M device and a BS according to an exemplary embodiment of the present invention.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system conforming to Institute of Electrical and Electronics Engineers (IEEE) 802.16 and 3GPP (3rd Generation Partnership Project) is being used. However, the description is applicable to any other mobile communication system except for specific features inherent to IEEE 802.16 and 3GPP.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), an Advanced Mobile Station (AMS), a machine to machine (M2M) device, etc. In addition, the term Base Station (BS) generically refers to any node at a network end which communicates with a UE, such as a Node B, an evolved Node B (eNode B), an Access Point (AP), etc.

In a mobile communication system, an MS can receive information from a BS on downlink and transmit data to the BS on uplink. Information transmitted from or received at the MS includes data and various types of control information. There are many physical channels depending on the types and usages of information transmitted from or received at MSs.

The embodiments of the present invention are applicable to a variety of wireless access systems such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as IEEE 802.11 (Wireless Fidelity (Wi-Fi)), IEEE 802.16 (Worldwide interoperability for Microwave Access (WiMAX)), IEEE 802-20, Evolved UTRA (E-UTRA), etc. UTRA is a part of Universal Mobile Telecommunications System (UMTS). 3GPP LTE is a part of Evolved UMTS (E-UMTS) using E-UTRA, employing OFDMA for downlink and SC-FDMA for uplink. LTE-A is an evolution of 3GPP LTE.

Hereinafter, M2M communication refers to communication between Mobile Stations (MSs) via a Base Station (BS), between a BS and MSs without human intervention, or between M2M devices. Accordingly, M2M devices refer to MSs which can support the above M2M communication. An Access Service Network (ASN) for an M2M service is defined as an M2M ASN and a network entity communicating with M2M devices is called an M2M server. The M2M server executes an M2M application and provides an M2M specific service for one or more M2M devices. An M2M feature indicates the feature of an M2M application and one or more features may be necessary to provide the application. An M2M device group refers to a group of M2M devices which share one or more common features.

Devices performing communication according to an M2M scheme (which may be called M2M devices, M2M communication devices, Machine Type Communication (MTC) devices, etc.) will increase in number in a given network as machine application types thereof increase. Machine application types under consideration are (1) security; (2) public safety; (3) tracking and tracing; (4) payment; (5) healthcare; (6) remote maintenance and control; (7) metering; (8) consumer devices; (9) fleet management in Point Of Sale (POS)-related and security-related application markets; (10) communication between devices at a vending machine; (11) remote control of machines and facilities and smart metering for automatically measuring the operation time of construction machines and facilities and heat or power consumption; and (12) surveillance video communication, which should not be construed as limiting the present invention. Besides, many other machine application types are being discussed.

Another feature of M2M devices is that they have low mobility, that is, they seldom move once installed. In other words, the M2M devices are stationary for a considerably long time. An M2M communication system may simplify or optimize mobility related operations for a specific M2M application having a fixed location, such as secured access and surveillance, public safety, payment, remote maintenance and control, and metering.

Hereinafter, the exemplary embodiments of the present invention will be described when M2M communication is applied to a wireless communication system (e.g. IEEE 802.16e/m). However, the present invention is not limited thereto and is applicable to other wireless communication systems such as 3GPP LTE systems.

FIG. 1 is a diagram schematically explaining the configuration of an M2M device and a BS according to an exemplary embodiment of the present invention.

Referring to FIG. 1, an M2M device 100 (which may be called an M2M communication device) may include a Radio Frequency (RF) unit 110 and a processor 120. A BS 150 may include an RF unit 160 and a processor 170. The M2M device 100 and the BS 150 may selectively include memories 130 and 180, respectively. The RF units 110 and 160 may respectively include transmitters 111 and 161, and receivers 112 and 162. The transmitter 111 and the receiver 112 of the M2M device 100 are configured to transmit and receive signals to and from the BS 150 and other M2M devices. The processor 120 is functionally connected to the transmitter 111 and the receiver 112 so that the processor 120 may control the transmitter 111 and the receiver 112 to exchange signals with other devices. The processor 120 may process signals to be transmitted and transmit the processed signals to the transmitter 111. The processor 120 may process signals received by the receiver 112. If necessary, the processor 120 may store information included in exchanged messages in the memory 130. With such a configuration, the M2M device 100 may perform methods of various embodiments of the present invention which will be described below.

Meanwhile, although not shown in FIG. 1, the M2M device 100 may additionally include a variety of configurations according to an application type thereof. For example, if the M2M device 100 is for smart metering, the M2M device 100 may include an additional configuration for power measurement, and an operation for such power measurement may be controlled by the processor 120 shown in FIG. 1 or an additionally configured processor (not shown).

Although, in FIG. 1, the case in which communication between the M2M device 100 and the BS 150 is performed is shown by way of example, an M2M communication method according to the present invention may be performed between one or more M2M devices, and each device may carry out methods according to various embodiments, which will be described below, with the same configuration as that of the device shown in FIG. 1.

The transmitter 161 and the receiver 162 of the BS 150 are configured to transmit and receive signals to and from other BSs, M2M servers, and M2M devices. The processor 170 is functionally connected to the transmitter 161 and the receiver 162 so that the processor 170 may control the transmitter 161 and the receiver 162 to exchange signals with other devices. The processor 170 may process signals to be transmitted and transmit the processed signals to the transmitter 161. The processor 170 may process signals received by the receiver 162. If necessary, the processor 170 may store information included in exchanged messages in the memory 180. With such a configuration, the BS 150 may perform methods of various embodiments of the present invention which will be described below.

The processors 120 and 170 of the M2M device 110 and the BS 150 direct (e.g. control, adjust, manage, etc.) operations of the M2M 110 and the BS 150, respectively. The processors 120 and 170 may be respectively connected to the memories 130 and 180 which store program codes and data. The memories 130 and 180 connected respectively to the processors 120 and 170 store operating systems, applications, and general files.

Each of the processors 120 and 170 of the present invention may be called a controller, a microcontroller, a microcomputer, etc. Meanwhile, each of the processors 120 and 170 may be implemented by hardware, firmware, software, or combinations thereof. When the embodiments of the present invention are implemented using hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), or the like, devised to perform the present invention, may be included in the processors 120 and 170.

Meanwhile, when the embodiments of the present invention are implemented using firmware or software, the firmware or software may be configured to include a module, a procedure, or a function which performs the function or operation of the present invention. The firmware or software configured to be able to perform the present invention may be included in the processors 120 and 170 or may be stored in the memories 130 and 180 so as to be executed by the processors 120 and 170.

A description will be given of persistent scheduling in an IEEE 802.16m system.

Persistent allocation is used to reduce allocation overhead for connections having a periodic traffic pattern and a relatively fixed payload size. To persistently allocate resources to an MS, a BS transmits a downlink (DL) persistent allocation A-MAP IE for DL allocation and an uplink (UL) persistent allocation A-MAP IE for UL allocation to the MS. If essential flow information is available for UL persistent allocation, the MS needs to give high priority to a service flow intended to carry data over the allocated resources through HARQ channel mapping, for example.

A configuration parameter of a persistently allocated resource must be maintained by the BS and the MS until persistent allocation is de-allocated or changed, or an error event is generated. Persistent scheduling does not include arrangements for HARQ (Hybrid Automatic Repeat request) retransmission of data initially transmitted using persistently allocated resources. A resource for DL retransmission is allocated using a DL basic assignment A-MAP IE. A resource for UL retransmission is allocated using a UL basic assignment A-MAP IE only when control information is changed.

An allocation mechanism will now be briefly described.

For persistent allocation in DL/UL, the BS needs to transmit a DL/UL persistent allocation A-MAP IE message. Persistent allocation of a resource is started at an AAI subframe indicated by the DL/UL persistent allocation A-MAP IE message and repeated after an allocation period set in the DL/UL persistent allocation A-MAP IE. A configuration parameter of a persistently allocated resource is maintained for each DL/UL persistent allocation A-MAP IE. Values of an ACID (corresponding to a HARQ channel identifier) and an N_ACID set in the DL/UL persistent allocation A-MAP IE are used together to describe implicit cycling of the ACID.

In initial transmission along with the DL/UL persistent allocation A-MAP IE, an ACID of a HARQ burst is set to a value described in initial_ACID field of the DL/UL persistent allocation A-MAP IE. From the next new transmission, the ACID of the HARQ burst increases by 1 and cycles in the range of initial_ACID, Mod (Initial_ACID+N_ACID)−1, 16. Here, initial_ACID is a start ACID value in initial transmission. If a retransmission process for a previous HARQ burst is not completed before a new HARQ burst having the same ACID is transmitted, the retransmission process for the previous HARQ burst is ended and the new HARQ burst is overridden.

The configuration parameter of the persistent allocation resource may be changed in order to facilitate link adaptation and avoid generation of a resource hole. To change persistent allocation, the BS transmits the DL persistent allocation A-MAP IE for DL allocation and the UL persistent allocation A-MAP IE for UL allocation to the MS. When the MS has an existing persistent allocation in a specific AAI subframe, the MS receives a new persistent allocation in the same AAI subframe and the new persistent allocation replaces the previous allocation (that is, the previous persistent allocation is de-allocated).

When the BS reallocates a persistent allocation resource in DL by transmitting the DL persistent allocation A-MAP IE, a different HARQ feedback channel is assigned according to the persistent allocation A-MAP IE used for retransmission. If an AKC signal for an allocated DL data burst is detected from a newly allocated HARQ feedback channel, the BS assumes that the DL persistent allocation A-MAP IE signaled for retransmission has been successfully received. If the ACK signal is not detected, the same DL persistent allocation A-MAP IE for retransmission can be retransmitted after the subsequent allocation period.

When a data burst identified and reallocated by a UL persistent allocation A-MAP IE is successfully decoded, the BS assumes that the UL persistent allocation A-MAP IE that signals reallocation has been successfully received. If the reallocated data burst is not successfully decoded, the same reallocation UL A-MAP IE can be retransmitted after the subsequent period.

A de-allocation mechanism will now be briefly described.

To de-allocate persistent allocation in DL/UL, the BS transmits a DL/UL persistent allocation A-MAP IE message to the MS. When an allocation period field is set to 0b00 in the DL/UL persistent allocation A-MAP IE message, a resource persistently allocated according to the DL/UL persistent allocation A-MAP IE message is de-allocated in a referenced DL/UL AAI subframe and the BS and the MS end persistent allocation. When the BS transmits the DL persistent allocation A-MAP IE (PA A-MAP IE) to the MS in order to de-allocate the resource persistently allocated in DL, a different HARQ feedback channel is assigned according to the persistent allocation A-MAP IE used for de-allocation. The MS transmits an AKC signal to the BS in order to indicate that the DL persistent allocation A-MAP IE message that signals de-allocation in the newly allocated HARQ feedback channel has been successfully received. The BS may retransmit the same de-allocation DL persistent allocation A-MAP IE message to the MS after the subsequent allocation period when the ACK is not received from the MS.

Asynchronous HARQ retransmission is used for DL persistent allocation. The DL basic allocation A-MAP IE message is transmitted to signal control information for HARQ retransmission. Synchronous HARQ retransmission is used for UL persistent allocation. The UL basic allocation A-MAP IE message is transmitted to signal control information for HARQ retransmission.

An error handling procedure will now be briefly described.

For HARQ enabled retransmission, an ACK signal is transmitted in order to indicate successful decoding of a data burst and a NACK signal is transmitted in order to signal failure of decoding of a burst transmitted on DL/UL. When an AKC signal with respect to a data burst identified by a DL persistent allocation A-MAP IE message is detected from a HARQ feedback channel assigned to a related HARQ process, the BS assumes that the MS has correctly received the DL persistent allocation A-MAP IE message. If an initial data burst identified by a UL persistent allocation A-MAP IE message is successfully decoded without additional transmission of a UL basic allocation A-MAP IE message for retransmission, the BS assumes that the UL persistent allocation A-MAP IE message has been successfully received.

When null detection is used, if the ACK or NACK signal is not present in a HARQ feedback channel allocated according to the DL persistent allocation A-MAP IE message for the data burst, the BS assumes that the MS has not received the DL persistent allocation A-MAP IE message and may retransmit the DL persistent allocation A-MAP IE message after the subsequent allocation period.

When persistent allocation is de-allocated in DL/UL, the BS signals HARQ feedback allocation through the DL/UL persistent allocation A-MAP IE message. The HARQ feedback allocation is used to identify a HARQ channel.

An ACK signal for the DL/UL persistent allocation A/MAP IE message that signals de-allocation is transmitted. When the ACK signal is not present (in case of null detection), the BS may retransmit the same DL/UL persistent allocation A-MAP IE message that signals de-allocation after the subsequent allocation period upon assuming that the MS has not received the DL/UL persistent allocation A-MAP IE message.

In the case of absence of a UL data burst in the resource assigned according to the UL persistent allocation A-MAP IE message, the UL data burst transmitted by the MS cannot be detected as a null signal while the UL data burst is not successfully decoded by the BS. In this case, the BS may transmit the same UL persistent allocation A-MAP IE message after the subsequent allocation period on the assumption that the MS has not successfully received the UL persistent allocation A-MAP IE message. To ensure successful reception of resource allocation information for subsequent persistent allocation, the initial data burst identified by the UL persistent allocation A-MAP IE message cannot be successfully decoded after N_MAX_ReTX HARQ retransmission, the subsequent persistent allocation cannot be successfully decoded and the same UL persistent allocation A-MAP IE message can be retransmitted after the subsequent allocation period.

The following table 1 shows an exemplary DL persistent allocation A-MAP IE message format.

TABLE 1

| Syntax | Size (bit) | Value/Description |
|---|---|---|
| DL persistent allocation A-MAP IE ( ) { | | |
| A-MAP IE Type | 4 | DL Persistent Allocation A-MAP_IE |
| Allocation Period | 2 | Period of persistent allocation If (Allocation Period==0b00), it indicates the deallocation of persistent resource. 0b00: deallocation 0b01: 2 frames 0b10: 4 frames 0b11: 6 frames |
| if (Allocation Period==0b00){ | | |
| Resource Index | 11 | Confirmation of the resource index for a previously assigned persistent resource that has been deallocated.512 FFT size: 0 in first 2 MSB bits + 9 bits for resource index1024 FFT size: 11 bits for resource index2048 FFT size: 11 bits for resource indexResource index includes location and allocation size |

TABLE 1-continued

| Syntax | Size (bit) | Value/Description |
|---|---|---|
| Long TTI Indicator | 1 | Indicates number of AAI subframes spanned by the allocated resource. 0b0: 1 AAI subframe (default) 0b1: 4 DL AAI subframes for FDD or all DL AAI subframes for TDD |
| HFA | 6 | Explicit Index for HARQ Feedback Allocation to acknowledge receipt of deallocation A-MAP IE |
| Reserved | 16 | Reserved bits |
| } else if (Allocation Period != 0b00){ | | |
| IsizeOffset | 5 | Offset used to compute burst size index |
| MEF | 2 | |
| if (MEF == 0b01){ | | |
| ... | ... | ... |
| } | | |
| Resource Index | 11 | Confirmation of the resource index for a previously assigned persistent resource that has been deallocated.512 FFT size: 0 in first 2 MSB bits + 9 bits for resource index1024 FFT size: 11 bits for resource index2048 FFT size: 11 bits for resource indexResource index includes location and allocation size |
| Long TTI Indicator | 1 | Indicates number of AAI subframes spanned by the allocated resource. 0b0: 1 AAI subframe (default) 0b1: 4 DL AAI subframes for FDD or all DL AAI subframes for TDD |
| HFA | 3 | HARQ Feedback Allocation |
| N_ACID | 2 | Number of ACIDs for implicit cycling of HARQ channel identifier.0b00: 10b01: 20b10: 30b11: 4 |
| Initial_ACID | 4 | Initial value of HARQ channel identifier for implicit cycling of HARQ channel identifiers. |
| Reserved | 2 | Reserved bits |
| } | | |
| } | | |

Referring to Table 1, the DL persistent allocation A-MAP IE message may include an A-MAP IE type field that indicates an A-MAP IE type, and an allocation period field. When the allocation period field is set to 0b00 which indicates de-allocation of persistent resources, the DL persistent allocation a-MAP IE message may include a resource index field that confirms a resource index for a previously assigned persistent resource that has been de-allocated, a long TTL indicator field that indicates the number of AAI subframes spanned by the allocated resource, and a HARQ feedback allocation (HFA) field that indicates an explicit index for HARQ feedback allocation to acknowledge receipt of de-allocation A-MAP IE.

In a case other than the case in which the allocation period field is set to 0b00, the DL persistent allocation a-MAP IE message may include the resource index field, the long TTI indicator field that indicates the number of AAI subframes spanned by the allocated resource, the HFA field that indicates HARQ feedback allocation, an N_ACID field that indicates the number of ACIDs for implicit cycling of HARQ channel identifier, and an initial_ACID field that indicates an initial value of a HARQ channel identifier for implicit cycling of HARQ channel identifiers.

The following table 2 shows an exemplary UL persistent allocation A-MAP IE message format.

TABLE 2

| Syntax | Size (bit) | Value/Description |
|---|---|---|
| UL persistent allocation A-MAP IE ( ) { | | |
| A-MAP IE Type | 4 | UL Persistent Allocation A-MAP_IE |
| Allocation Period | 2 | Period of persistent allocation If (Allocation Period==0b00), it indicates the deallocation of persistent resource. 0b00: deallocation 0b01: 2 frames 0b10: 4 frames 0b11: 6 frames |
| if (Allocation Period==0b00){ | | |
| Resource Index | 11 | Confirmation of the resource index for a previously assigned persistent resource that has been deallocated512 FFT size: 0 in first 2 MSB bits + 9 bits for resource index1024 FFT size: 11 bits for resource index2048 FFT size: 11 bits for resource indexResource index includes location and allocation size |
| TTI and Relevance | 2 | Indicates the TTI type and the location of UL subframe relevant to this A-MAP.0b00: long TTI0b01: default TTI, the first UL subframe relevant to this A-MAP0b10: default TTI, the second UL subframerelevant to this A-MAP0b11: default TTI, the third UL subframe relevant to this A-MAP0b10 and 0b11 are only applicable if the number of DL AAI subframes is less than the number of UL AAI subframes in TDD mode. |
| HFA | 6 | Explicit Index for HARQ Feedback Allocation to acknowledge receipt of deallocation A-MAP IE |
| Reserved | 16 | Reserved bits |
| } else if (Allocation Period != 0b00){ | | |
| IsizeOffset | 5 | Offset used to compute burst size index |
| $M_t$ | 1 | Number of streams in transmission up to 2 streams per AMS supported $N_t$: Number of transmit antennas at the AMS 0b0: 1 stream 0b1: 2 streams |
| if (MEF == 0b01){ | | |
| ... | ... ... | |
| } | | |
| Resource Index | 11 | 512 FFT size: 0 in first 2 MSB bits + 9 bits for resource index 1024 FFT size: 11 bits for resource index 2048 FFT size: 11 bits for resource index Resource index includes location and allocation size |
| TTI and Relevance | 2 | Indicates the TTI type and the location of UL subframe relevant to this A-MAP.0b00: long TTI0b01: default TTI, the first UL subframe relevant to this A-MAP0b10: default TTI, the second UL subframerelevant to this A-MAP0b11: default TTI, the third UL subframe relevant to this A-MAP0b10 and 0b11 are only applicable if the number of DL AAI subframes is less than the number of UL AAI subframes in TDD mode. |
| HFA | 3 | HARQ Feedback Allocation |
| N_ACID | 2 | Number of ACIDs for implicit cycling of HARQ channel identifier.0b00: 10b01: 20b10: 30b11: 4 |
| Initial_ACID | 4 | Initial value of HARQ channel identifier for implicit cycling of HARQ channel identifiers. |
| Reserved | 2 | Reserved bits |
| } | | |
| } | | |

Referring to Table 2, the UL persistent allocation A-MAP IE message may include an A-MAP IE type field that indicates an A-MAP IE type, and an allocation period field. When the allocation period field is set to 0b00 which indicates de-allocation of persistent resource, the UL persistent allocation a-MAP IE message may include a resource index field that confirms a resource index for a previously assigned persistent resource that has been de-allocated, a TTI and relevance field that indicates the TTI type and the location of UL subframe relevant to this A-MAP, and an HFA field that indicates an explicit index for HARQ feedback allocation to acknowledge receipt of de-allocation A-MAP IE.

In a case other than the case in which the allocation period field is set to 0b00, the UL persistent allocation a-MAP IE message may include an IsizeOffset field that indicates an offset used to compute a burst size index, an Mt field that indicates the number of streams in transmission up to 2 streams per AMS supported, the resource index field, the TTI and relevance field that indicates the TTI type and the location of UL subframe relevant to this A-MAP, the HFA field that indicates HFA feedback allocation, an N_ACID field that indicates the number of ACIDs for implicit cycling of HARQ channel identifier, and an initial_ACID field that indicates an initial value of HARQ channel identifier for implicit cycling of HARQ channel identifiers.

A description will be given of persistent scheduling in IEEE 802.16m advanced air interface (AAI) in order to explain long cycle persistent scheduling in M2M.

In IEEE 802.16m AAI systems, long cycle allocation is used for high priority M2M connection having a periodic traffic pattern and relatively fixed payload size. To persistently assign a resource to a fixed M2M device, the BS may transmit, to the M2M device, a UL M2M persistent allocation A-MAP IE for UL allocation having a long allocation cycle.

A UL resource allocated according to long cycle persistent scheduling may be temporarily changed. To temporarily change UL persistent allocation, the BS may set an allocation period to 0b1111, for example, and transmit the UL M2M persistent allocation A-MAP IE to the M2M device. When the M2M device has an existing persistent allocation in a specific AAI subframe and receives a new resource allocation in the same AAI subframe by receiving the UL M2M persistent allocation A-MAP IE having the allocation period set to 0b1111, the new resource allocation replaces the original persistent allocation only in the AAI subframe (that is, the original persistent allocation is restarted from the next allocation period).

A de-allocation mechanism will now be described.

In de-allocation of long cycle persistent scheduling according to the UL M2M persistent allocation a-MAP IE message, when a de-allocation type is set to 0b0 (i.e. permanent de-allocation), a persistent resource allocated by the UL M2M persistent allocation A-MAP IE message should be de-allocated in a reference UL subframe and the BS and the M2M device need to finish persistent allocation. If not (i.e. in case of one-time de-allocation), the persistent resource allocated by the UL M2M persistent allocation A-MAP IE message should be de-allocated one time in the reference UL subframe and the BS and the M2M device need to maintain previous persistent allocation.

The following table 3 shows an exemplary UL M2M persistent allocation A-MAP IE message format.

TABLE 3

| Syntax | Size(bit) | Value/Description |
| --- | --- | --- |
| UL persistent allocation A-MAP IE ( ) { | | |
| A-MAP IE Type | 4 | UL M2M Persistent Allocation A-MAP_IE |
| Allocation Period | 2 | Period of persistent allocation for M2M: 0b0000: deallocation 0b0001: 2 frames 0b0010: 4 frames 0b0011: 6 frames 0b0100: 5 superframes 0b0101: 10 superframes 0b0110: 25 superframes 0b0111: 50 superframes 0b1000-0b1110: Reserved0b1111: One-time re-allocation |
| if (Allocation Period==0b00){ | | |
| Resource Index | 11 | Confirmation of the resource index for a previously assigned persistent resource that has been deallocated512 FFT size: 0 in first 2 MSB bits + 9 bits for resource index1024 FFT size: 11 bits for resource index2048 FFT size: 11 bits for resource indexResource index includes location and allocation size |
| TTI and Relevance | 2 | Indicates the TTI type and the location of UL subframe relevant to this A-MAP.0b00: long TTI0b01: default TTI, the first UL subframe relevant to this A-MAP0b10: default TTI, the second UL subframe relevant to this A-MAP0b11: default TTI, the third UL subframe relevant to this A-MAP |
| HFA | 6 | Explicit Index for HARQ Feedback Allocation to acknowledge receipt of deal-location A-MAP IE |
| De-allocation flag | 1 | 0b0: Permanent de-allocationThe resource indicated by resource index is de-allo-cated at UL subframe referenced by this A-MAP IE and the related persistent allocation is terminated.0b1: One-time de-allocation The resource indicated by resource index is de-allocated at UL subframe referenced by this A-MAP IE and the related persistent allocation is retained. |
| Reserved | 13 | Reserved bits |
| } else if (Allocation Period != 0b00){ | | |
| IsizeOffset | 5 | Offset used to compute burst size index |
| Resource Index | 11 | Confirmation of the resource index for a previously assigned persistent resource that has been deallocated512 FFT size: 0 in first 2 MSB bits + 9 bits for re-sourceindex1024 FFT size: 11 bits for resource index2048 FFT size: 11 bits for resource indexResource index includes location and allocation size |
| TTI and Relevance | 2 | Indicates the TTI type and the location of UL subframe relevant to this A-MAP.0b00: long TTI0b01: default TTI, the first UL subframe relevant to this A-MAP0b10: default TTI, the second UL subframe relevant to this A-MAP0b11: default TTI, the third UL subframe relevant to this A-MAP |
| HFA | 3 | HARQ Feedback Allocation |
| N_ACID | 2 | Number of ACIDs for implicit cycling ofHARQ channel identifier.0b00: 10b01: 20b10: 30b11: 4 |
| Initial_ACID | 4 | Initial value of HARQ channel identifier forimplicit cycling of HARQ channel identifiers. |
| Reserved | 5 | Reserved bits |
| } } | | |

Referring to Table 3, the UL persistent allocation A-MAP IE message may include an A-MAP IE type field that indicates an A-MAP IE type, and an allocation period field. The allocation period field may indicate de-allocation when set to 0b0000 and may indicate one-time re-allocation when set to 0b1111.

When the allocation period field is set to 0b0000 which indicates de-allocation of persistent resource, the UL persistent allocation a-MAP IE message may include a resource index field that confirms a resource index for a previously assigned persistent resource that has been de-allocated, a TTI and relevance field that indicates the TTI type and the location of UL subframe relevant to this A-MAP, an HFA field that indicates an explicit index for HARQ feedback allocation to acknowledge receipt of de-allocation A-MAP IE, and a de-allocation flag field that indicates permanent de-allocation or one-time de-allocation. The de-allocation flag field indicates permanent de-allocation when set to 0b0 and indicates one-time de-allocation when set to 0b1.

In a case other than the case in which the allocation period field is set to 0b0000, the UL persistent allocation A-MAP IE message may include an IsizeOffset field that indicates an offset used to compute a burst size index, an Mt field that indicates the number of streams in transmission of up to two streams supported for each MS, the resource index field, the TTI and relevance field that indicates the TTI type and the location of a UL subframe relevant to this A-MAP, the HFA field that indicates HFA feedback allocation, an N_ACID field that indicates the number of ACIDs for implicit cycling of HARQ channel identifier, and an initial_ACID field that indicates an initial value of HARQ channel identifier for implicit cycling of HARQ channel identifiers.

For error recovery of the A-MAP IE for de-allocation, the DL/UL persistent allocation A-MAP IE can include HARQ feedback allocation (HFA) information like de-allocation of the persistent scheduling in the IEEE 802.16m system.

When an MS sends a HARQ ACK signal through HFA assigned thereto, the BS determines that the MS has successfully received the UL persistent allocation A-MAP IE message for de-allocation. If the BS does not receive the ACK signal from the MS through the HFA assigned to the MS, the BS may retransmit the UL persistent allocation A-MAP IE message to the MS for error recovery. That is, the BS can assign HFA for the UL persistent A-MAP IE message whenever transmitting the UL persistent A-MAP IE message for de-allocation to prevent continuous packet errors generated when the MS does not receive the UL persistent allocation A-MAP IE message for de-allocation.

However, in IEEE 802.16p related to M2M devices, a serious problem is not generated in one-time de-allocation of long cycle persistent scheduling even if HFA for the persistent allocation A-MAP IE message for de-allocation is not assigned because de-allocation is performed only at a corresponding time. That is, in a one-time de-allocation scenario, continuous packet errors are not generated even if a corresponding M2M device misses the persistent allocation A-MAP IE message, and assignment of HFA for de-allocation increases unnecessary HFA resource allocation and power consumption of the M2M device for HFA transmission.

To solve this problem, the present invention proposes a scheme of assigning HFA only in the case of permanent de-allocation without allocating HFA in the case of one-time de-allocation. Accordingly, the processor 120 of the M2M device can control HARQ feedback for the UL M2M persistent allocation A-MAP IE message not to be transmitted upon receiving the UL M2M persistent allocation A-MAP IE message that directs one-time de-allocation from the BS.

The following table 4 shows an exemplary UL M2M persistent allocation A-MAP IE proposed by the present invention.

TABLE 4

| Syntax | Size (bits) | Value/Description |
|---|---|---|
| UL M2M Persistent Allocation A-MAP_IE( ) { | — | — |
| A-MAP IE Type | 4 | UL M2M Persistent Allocation A-MAP_IE |
| Allocation Period | 4 | Period of persistent allocation for M2M:0b0000: deallocation0b0001: 2 frames0b0010: 4 frames0b0011: 6 frames0b0100: 5 superframes0b0101: 10 superframes0b0110: 25 superframes 0b0111: 50 superframes 0b1000~0b1110: reserved0b1111: One-time re-allocation |
| if (Allocation Period==0b0000){ | — | — |
| Resource Index | 11 | Confirmation of the resource index for a previously assigned persistent resource that has been deallocated512 FFT size: 0 in first 2 MSB bits + 9 bits for resource index1024 FFT size: 11 bits for resource index2048 FFT size: 11 bits for resource indexResource index includes location and allocation size |
| TTI and Relevance | 2 | Indicates the TTI type and the location of UL subframe relevant to this A-MAP.0b00: long TTI0b01: default TTI, the first UL subframe relevant to this A-MAP0b10: default TTI, the second UL subframe relevant to this A-MAP0b11: default TTI, the third UL subframe relevant to this A-MAP |
| De-allocation flag | 1 | 0b0: Permanent de-allocation. The resource indicated by resource index is de-allocated at UL subframe referenced by this A-MAP IE and the related persistent allocation is terminated.0b1: One-time de-allocationThe resource indicated by resource index is de-allocated at UL subframe referenced by this A-MAP IE and the related persistent allocation is retained. |
| If (De-allocation flag ==0b0) { | | |
| HFA | 6 | Explicit Index for HARQ Feedback Allocation to acknowledge receipt of deallocation A-MAP IE |
| Reserved } else { | 12 | Reserved bits |
| Reserved } | 18 | Reserved bits |
| } else if (Allocation Period != 0b0000){ | — | — |
| $I_{sizeOffset}$ | 5 | Offset used to compute burst size index |
| Resource Index | 11 | 512 FFT size: 0 in first 2 MSB bits + 9 bits for resource index1024 FFT size: 11 bits for resource index2048 FFT size: 11 bits for resource index Resource index includes location and allocation size |

TABLE 4-continued

| Syntax | Size (bits) | Value/Description |
|---|---|---|
| TTI and Relevance | 2 | Indicates the TTI type and the location of UL subframe relevant to this A-MAP.0b00: long TTI0b01: default TTI, the first UL subframe relevant to this A-MAP0b10: default TTI, the second UL subframe relevant to this A-MAP0b11: default TTI, the third UL subframe relevant to this A-MAP |
| HFA | 3 | HARQ Feedback Allocation |
| N_ACID | 2 | Number of ACIDs for implicit cycling of HARQ channel identifier.0b00: 10b01: 20b10: 30b11: 4 |
| Initial_ACID | 4 | Initial value of HARQ channel identifier for implicit cycling of HARQ channel identifiers. |
| Reserved } } | 5 | Reserved bits |

Referring to Table 4, the UL M2M persistent allocation A-MAP IE message may include an A-MAP IE type field that indicates an A-MAP IE type, and an allocation period field. The allocation period field may indicate de-allocation when set to 0b0000 and may indicate one-time re-allocation when set to 0b1111.

When the allocation period field is set to 0b0000 to indicate de-allocation of persistent allocation, the UL M2M persistent allocation A-MAP IE message may include a resource index field that confirms a resource index for a previously assigned persistent resource that has been de-allocated, a TTI and relevance field that indicates the TTI type and the location of UL subframe relevant to this A-MAP, an HFA field that indicates an explicit index for HARQ feedback allocation to acknowledge receipt of de-allocation A-MAP IE, and a de-allocation flag field that indicates permanent de-allocation or one-time de-allocation. Here, the de-allocation field may indicate permanent de-allocation when set to 0b0 and may indicate one-time de-allocation when set to 0b1.

When the de-allocation flag is set to 0b0, the UL M2M persistent allocation A-MAP IE message may further include the HFA field that indicates an explicit index for HARQ feedback allocation to acknowledge receipt of de-allocation A-MAP IE.

In a case other than the case in which the allocation period field is set to 0b0000, the UL M2M persistent allocation A-MAP IE message may include an IsizeOffset field that indicates an offset used to compute a burst size index, an Mt field that indicates the number of streams in transmission of up to 2 streams per AMS supported, the resource index field, the TTI and relevance field that indicates the TTI type and the location of UL subframe relevant to this A-MAP, the HFA field that indicates HFA feedback allocation, an N_ACID field that indicates the number of ACIDs for implicit cycling of HARQ channel identifier, and an initial_ACID field that indicates an initial value of HARQ channel identifier for implicit cycling of HARQ channel identifiers.

Figure 2:
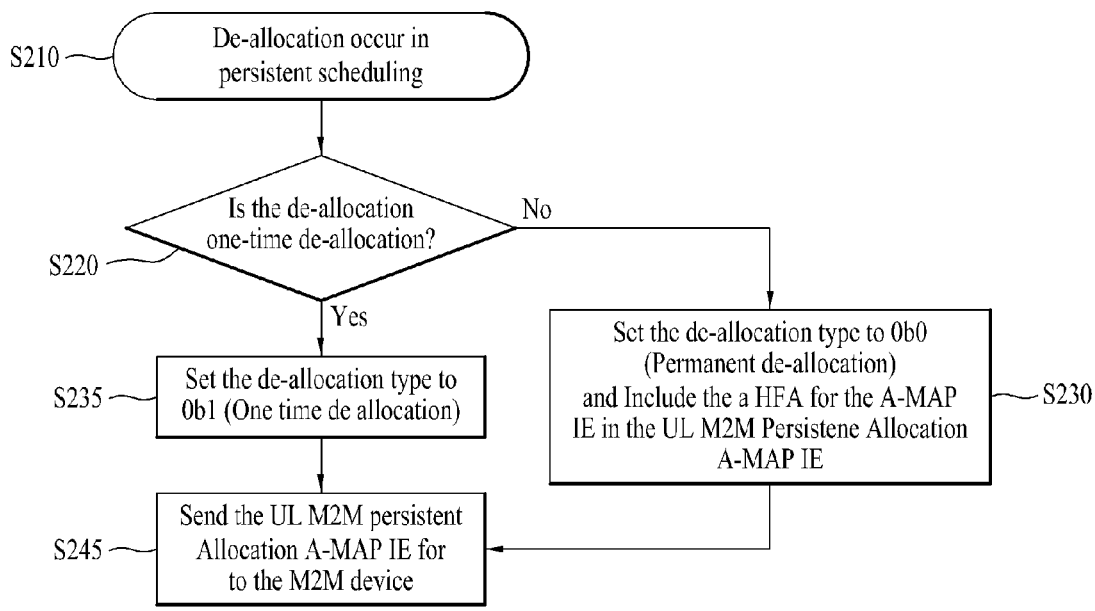
FIG. 2 is a flowchart illustrating a de-allocation operation of a BS to de-allocate a resource that has been assigned to an M2M device according to an embodiment of the present invention.

FIG. 2 is a flowchart illustrating a de-allocation operation of the BS to de-allocate a resource assigned to the M2M device according to an embodiment of the present invention.

Referring to FIG. 2, upon generation of an event of de-allocating a resource assigned to the M2M in the BS (e.g. a de-allocation event in persistent scheduling) (S210), the BS determines whether or not de-allocation is temporary (one-time de-allocation) (S220). If the de-allocation corresponds to permanent de-allocation (S220), the BS may include HFA for A-MAP IE in the UL M2M persistent allocation A-MAP IE and transmit the UL M2M persistent allocation A-MAP IE message to the M2M device (S230). In this case, the BS may set a de-allocation type to 0b0, for example, in the UL M2M persistent allocation A-MAP IE message to set permanent de-allocation.

If the de-allocation corresponds to one-time de-allocation (S220), the BS sets the de-allocation type to 0b1 in the UL M2M persistent allocation A-MAP IE message to set one-time de-allocation (S235), includes HFA information about the A-MAP IE in the UL M2M persistent allocation A-MAP IE message instead of M2M persistent allocation A-MAP IE and transmits the UL M2M persistent allocation A-MAP IE message including the HFA information to the M2M device (S245).

Figure 3:
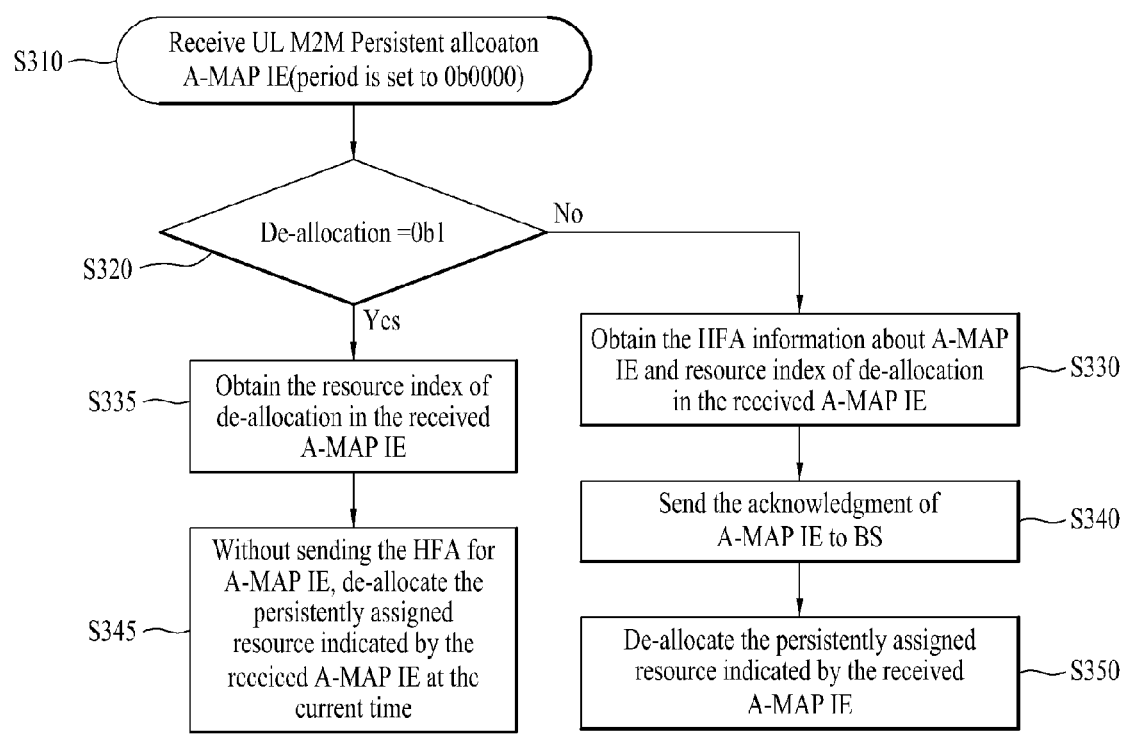
FIG. 3 is a flowchart illustrating a de-allocation operation of the BS to de-allocate a resource that has been assigned to the M2M device according to another embodiment of the present invention.

FIG. 3 is a flowchart illustrating a de-allocation operation of the BS to de-allocate a resource assigned to the M2M device according to another embodiment of the present invention.

Referring to FIG. 3, the M2M device may receive the UL M2M persistent allocation A-MAP IE message that indicates de-allocation (that is, the allocation period is set to 0b0000) from the BS (S310). Then, the M2M device checks the de-allocation type (S320). When the de-allocation type is 0b0 that indicates permanent de-allocation, the processor 120 of the M2M device may obtain a resource index of de-allocation and the HFA information about the A-MAP IE from the received UL M2M persistent allocation A-MAP IE message (S330). The M2M device transmits an ACK signal for the UL M2M persistent allocation A-MAP IE message to the BS (S340). The M2M device permanently de-allocates a resource indicated by the UL M2M persistent allocation A-MAP IE message and deletes related persistent allocation information (S350).

When the de-allocation type is 0b1 that indicates one-time de-allocation, the M2M device may obtain a resource index of de-allocation from the received UL M2M persistent allocation A-MAP IE message (S335). Then, the M2M device de-allocates a resource indicated by the received UL M2M persistent allocation A-MAP IE message at the corresponding time without sending HFA for the UL M2M persistent allocation A-MAP IE message, and maintains persistent allocation information (S345).

Since the M2M device de-allocates the resource indicated by the UL M2M persistent allocation A-MAP IE message at the corresponding time and maintains the persistent allocation information when the UL M2M persistent allocation A-MAP IE message indicates one-time de-allocation, the HFA information is not transmitted through the UL M2M persistent allocation A-MAP IE message. The BS also maintains previous persistent allocation when the UL M2M persistent allocation A-MAP IE message indicates one-time de-allocation.

Because the UL M2M persistent allocation A-MAP IE message does not include the HFA information that indicates one-time de-allocation, the M2M device does not send an ACK signal for the received UL M2M persistent allocation A-MAP IE message.

As described above, HFA information is not included in a UL M2M persistent allocation A-MAP IE message in the case of one time de-allocation which de-allocates resource allocation at a corresponding time while maintaining persistent allocation information such that an acknowledgement signal for the UL M2M persistent allocation A-MAP IE message which directs de-allocation only at the time is not transmitted, thereby considerably reducing overhead and improving communication performance.

Operations of the M2M device other than unique operations of the M2M device are applicable to MSs.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Apparatus and method for transmitting and receiving persistent scheduling information are applied to wireless communication system such as 3GPP LTE, LTE-A, IEEE 802 and like that.

The invention claimed is:

1. A method of transmitting uplink persistent allocation information at a base station (BS) in a wireless communication system, the method comprising:
   transmitting, to a machine-to-machine (M2M) device, the uplink persistent allocation information for the M2M device, the uplink persistent allocation information comprising de-allocation information,
   wherein when the de-allocation information indicates a de-allocation corresponds to a permanent de-allocation, the uplink persistent allocation information further comprises information related to hybrid automatic repeat request (HARQ) feedback allocation for acknowledging receipt of the uplink persistent allocation information, and
   wherein when the de-allocation information indicates the de-allocation corresponds to a one-time de-allocation, the uplink persistent allocation information does not comprise the information related to the HARQ feedback allocation for acknowledging receipt of the uplink persistent allocation information.

2. The method according to claim 1, wherein when the de-allocation information indicates the one-time de-allocation, a resource indicated by the uplink persistent allocation information is de-allocated in a corresponding uplink subframe and a related persistent allocation is retained.

3. The method according to claim 1, wherein a related persistent allocation is terminated when the de-allocation information indicates the permanent de-allocation.

4. The method according to claim 1, wherein the uplink persistent allocation information further comprises an uplink M2M persistent allocation A-MAP IE (Information Element) message.

5. A method of receiving uplink persistent allocation information at a machine-to-machine (M2M) device in a wireless communication system, the method comprising:
receiving, from a base station (BS), the uplink persistent allocation information for the M2M device, the uplink persistent allocation information comprising de-allocation information,
wherein when the de-allocation information indicates a de-allocation corresponds to a permanent de-allocation, the uplink persistent allocation information further comprises information related to hybrid automatic repeat request (HARQ) feedback allocation for acknowledging receipt of the uplink persistent allocation information, and
wherein when the de-allocation information indicates the de-allocation corresponds to a one-time de-allocation, the uplink persistent allocation information does not comprise the information related to the HARQ feedback allocation for acknowledging receipt of the uplink persistent allocation information.

6. The method according to claim 5, wherein when the de-allocation information indicates the one-time de-allocation, a resource indicated by the uplink persistent allocation information is de-allocated in a corresponding uplink subframe and a related persistent allocation is retained.

7. The method according to claim 5, wherein a related persistent allocation is terminated when the de-allocation information indicates the permanent de-allocation.

8. The method according to claim 5, wherein the M2M device does not transmit an HARQ feedback for receipt of the uplink persistent allocation information when the de-allocation corresponds to the one-time de-allocation.

9. The method according to claim 5, wherein the uplink persistent allocation information further comprises an uplink M2M persistent allocation A-MAP IE (Information Element) message.

10. A base station (BS) for transmitting uplink persistent allocation information in a wireless communication system, the BS comprising:
a transmitter; and
a processor configured to control:
the transmitter to transmit, to a machine-to-machine (M2M) device, the uplink persistent allocation information for the M2M device, the uplink persistent allocation information comprising de-allocation information,
wherein when the de-allocation information indicates the de-allocation corresponds to a permanent de-allocation, the uplink persistent allocation information further comprises information related to hybrid automatic repeat request (HARQ) feedback allocation for acknowledging receipt of the uplink persistent allocation information, and
wherein when the de-allocation information indicates the de-allocation corresponds to a one-time de-allocation, the uplink persistent allocation information does not comprise the information related to the HARQ feedback allocation for acknowledging receipt of the uplink persistent allocation information.

11. A machine-to-machine (M2M) device for receiving uplink persistent allocation information in a wireless communication system, the M2M device comprising:
a receiver; and
a processor configured to control:
the receiver to receive, from a base station (BS), the uplink persistent allocation information for the M2M device, the uplink persistent allocation information comprising de-allocation information,
wherein when the de-allocation information indicates a de-allocation corresponds to a permanent de-allocation, the uplink persistent allocation information further comprises information related to hybrid automatic repeat request (HARQ) feedback allocation for acknowledging receipt of the uplink persistent allocation information, and
wherein when the de-allocation information indicates the de-allocation corresponds to a one-time de-allocation, the uplink persistent allocation information does not comprise the information related to the HARQ feedback allocation for acknowledging receipt of the uplink persistent allocation information.

12. The M2M device according to claim 11, wherein the processor is further configured to control:
the transmitter not to transmit an HARQ feedback for receipt of the uplink persistent allocation information when the de-allocation corresponds to the one-time de-allocation.

13. The M2M device according to claim 11, wherein when the de-allocation information indicates the one-time de-allocation,
a resource indicated by the uplink persistent allocation information is de-allocated in a corresponding uplink subframe, and
wherein the processor is further configured to retain a related persistent allocation.

14. The M2M device according to claim 11, wherein the processor is further configured to terminate a related persistent allocation when the de-allocation information indicates the permanent de-allocation.

* * * * *